(12) United States Patent
Nguyen et al.

(10) Patent No.: US 10,872,260 B2
(45) Date of Patent: Dec. 22, 2020

(54) COLLATION DEVICE, COLLATION METHOD, AND RECORDING MEDIUM

(71) Applicant: Panasonic Intellectual Property Management Co., Ltd., Osaka (JP)

(72) Inventors: Khang Nguyen, Shiga (JP); Jubin Johnson, Singapore (SG); Sugiri Pranata Lim, Singapore (SG); Sheng Mei Shen, Singapore (SG); Shunsuke Yasugi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 192 days.

(21) Appl. No.: 16/181,384

(22) Filed: Nov. 6, 2018

(65) Prior Publication Data

US 2019/0156137 A1    May 23, 2019

(30) Foreign Application Priority Data

Nov. 17, 2017    (JP) ................. 2017-222192

(51) Int. Cl.
*G06K 9/32* (2006.01)
*G06K 9/62* (2006.01)
*G06K 9/00* (2006.01)
*G06F 16/00* (2019.01)

(52) U.S. Cl.
CPC .......... *G06K 9/3233* (2013.01); *G06F 16/00* (2019.01); *G06K 9/00771* (2013.01); *G06K 9/3258* (2013.01); *G06K 9/6203* (2013.01); *G06K 9/6215* (2013.01); *G06K 2209/15* (2013.01)

(58) Field of Classification Search
CPC .. G06K 9/3233; G06K 9/6215; G06K 9/3258; G06K 9/00771; G06K 9/6203; G09K 2209/15; G06F 16/00
See application file for complete search history.

(56) References Cited

U.S. PATENT DOCUMENTS

2007/0285809 A1   12/2007   Takahashi
2015/0010237 A1*   1/2015   Nomura ............... G06K 9/3241
                                              382/195
2018/0268238 A1*   9/2018   Khan ................... G06F 16/583

FOREIGN PATENT DOCUMENTS

WO      2006/082644      8/2006

* cited by examiner

*Primary Examiner* — Wayne H Cai
(74) *Attorney, Agent, or Firm* — McDermott Will & Emery LLP (57) ABSTRACT

A collation device includes: a storage that stores a search target image showing a search target; an acquisition unit that acquires a captured image generated by an imaging device; and a controller that determines whether the search target is included in the captured image. The controller searches out a collation area in the captured image, the collation area including a subject similar to at least a part of the search target, and selects, depending on the collation area, at least one of a whole of the search target image and a part of the search target image, and collates the selected at least one with the captured image so as to determine whether the search target is included in the captured image.

10 Claims, 9 Drawing Sheets

COLLATION DEVICE, COLLATION METHOD, AND RECORDING MEDIUM

BACKGROUND

1. Technical Field

The present disclosure relates to a collation device, a collation method, and a recording medium for specifying an image including an object.

2. Description of the Related Art

PCT International Publication No. 2006/082644 discloses a vehicle image data generation device that generates vehicle image data from imaging data generated by imaging a vehicle. The generated vehicle image data includes a portion by which the vehicle is identifiable. This vehicle image data generation device specifies a region of a vehicle body in the imaging data, and extracts an area for identifying the vehicle based on the region of the vehicle body, thereby generating the vehicle image data. In this way, a data volume of an image is reduced while leaving the identification of the vehicle enabled.

SUMMARY

The present disclosure provides a collation device, a collation method, and a recording medium for enhancing collation performance.

A collation device of the present disclosure includes: a storage that stores a search target image showing a search target; an acquisition unit that acquires a captured image generated by an imaging device; and a controller that determines whether the search target is included in the captured image. The controller searches out a collation area in the captured image, the collation area including a subject similar to at least a part of the search target, and selects, depending on the collation area, at least one of a whole of the search target image and a part of the search target image, and collates the selected at least one with the captured image so as to determining whether the search target is included in the captured image.

These general and specific aspects may be achieved by a system, a method, and a computer program, and any combination of these.

In accordance with the collation device, the collation method and the recording medium according to the present disclosure, the controller searches out a collation area in the captured image acquired from the imaging device, the collation area including a subject similar to at least a part of the search target, and selects, depending on the collation area, at least one of a whole of the search target image and a part of the search target image, and collates the selected at least one with the captured image. Therefore, collation opportunities are increased. Hence, the collation performance is enhanced. Moreover, by the collation as described above, it is determined whether the search target is included in the captured image, and accordingly, the captured image including the search target can be specified precisely.

DETAILED DESCRIPTION

Knowledge Underlying the Present Disclosure

In the case of specifying a captured image including a search target (for example, a vehicle) from among a plurality of captured images generated by a plurality of monitoring cameras installed in a town, there is a method of collating a subject with the search target. Here, the subject is present in the captured image and corresponds to the search target. For example, when the search target is a vehicle, the whole of the subject is compared and collated with the vehicle as the search target. However, sometimes, the whole of the subject is similar to the vehicle as the search target in terms of shape. In this case, it is sometimes difficult to specify the captured image showing the vehicle as the search target from among the plurality of captured images, that is, to narrow down candidates for the same vehicle as the search target. As another collation method, there is a method of acquiring a feature portion from a captured image and collating the acquired feature portion with a feature portion of a search target. For example, when the search target is a vehicle, numbers of a number plate of the vehicle are used as the feature portion. In this case, the numbers of the number plate, which are extracted from the captured image, are compared with numbers of a number plate of the search target. However, for example, when a resolution of the captured image is low, or when the captured image is generated in a dark state of lighting, the numbers of the number plate cannot sometimes be captured. In this case, the numbers cannot be compared with each other. Hence, heretofore, it has sometimes been impossible to perform the collation due to image quality of the captured image, and other reasons.

A collation device according to the present disclosure performs the collation using both of an entire image of the search target and a local image including a feature portion specific, unique, or intrinsic to the search target. The local image of the feature portion, the local image having higher accuracy than the entire image, is used, whereby collation performance is enhanced. This can make it easy to narrow down the candidates for the captured image including the search target. Moreover, if either the whole of the search target or the feature portion of the search target is included in the captured image, then the collation for specifying the captured image including the search target can be carried out. This prevents the collation opportunities from being reduced.

First Exemplary Embodiment

A first exemplary embodiment will be described below with reference to the drawings. In the present exemplary embodiment, an example where the search target is a vehicle will be described. Specifically, in the present exemplary embodiment, as an example of the collation, described will be an example of collating captured images generated by monitoring cameras in a town with an image of a specific vehicle as the search target, and specifying a captured image showing the vehicle as the search target.

1.1 Configuration of Collation Device

Figure 1:
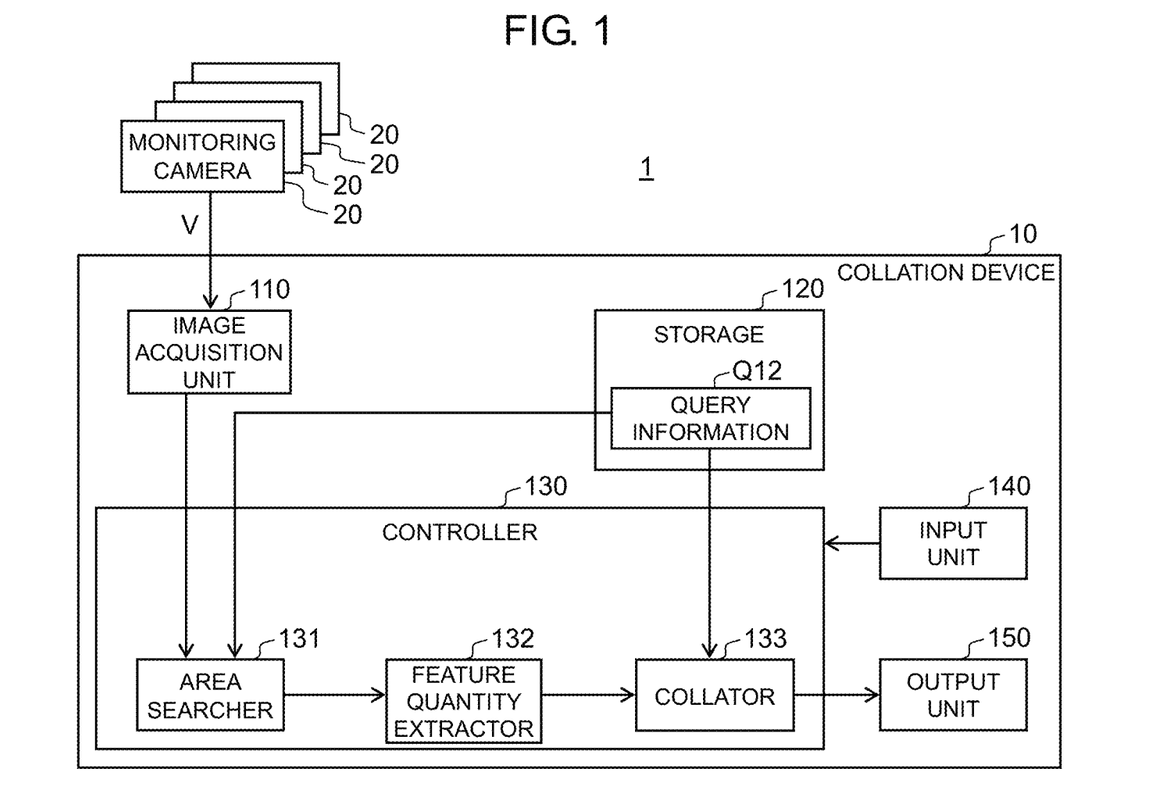
FIG. 1 is a diagram illustrating a configuration of a collation device according to a first exemplary embodiment.

FIG. 1 illustrates a configuration of a collation device according to the first exemplary embodiment of the present disclosure. Collation device 10 and a plurality of monitoring cameras 20 (examples of imaging devices) constitute collation system 1. Collation system 1 collates a plurality of captured images with an image of a search target. Collation device 10 is one of various information processing devices such as personal computers and tablet terminals. Each of monitoring cameras 20 includes an image sensor such as a charge-coupled device (CCD) image sensor, a complementary metal oxide semiconductor (CMOS) image sensor, and an N-channel metal oxide semiconductor (NMOS) image sensor. The plurality of monitoring cameras 20 are disposed in a town, and image different places. Collation device 10 acquires captured images generated by respective monitoring cameras 20, and collates the captured images thus acquired with an image of a vehicle as the search target.

Collation device 10 includes image acquisition unit 110, storage 120, controller 130, input unit 140, and output unit 150.

Image acquisition unit 110 includes a circuit that communicates with an external instrument in conformity with a predetermined communication standard (for example, local area network (LAN), Wi-Fi (registered trademark), Bluetooth (registered trademark), universal serial bus (USB), and HDMI (registered trademark)). Image acquisition unit 110 acquires the captured images generated by monitoring cameras 20.

Storage 120 is a storage medium that stores programs and data necessary to achieve a function of collation device 10. Storage 120 stores query information Q12 that is information indicating the vehicle that is the search target. Storage 120 can be configured with, for example, a hard disk (HDD), a solid state drive (SSD), a random access memory (RAM), a dynamic random access memory (DRAM), a ferroelectric memory, a flash memory, or a magnetic disk. Alternatively, storage 120 can be configured with any combination of the HDD, the SSD, the RAM, the DRAM, the ferroelectric memory, the flash memory, and the magnetic disk.

Controller 130 can be configured with a semiconductor element or the like. Controller 130 can be configured with, for example, a microcomputer, a central processing unit (CPU), a micro processing unit (MPU), a graphic processing unit (GPU), a digital signal processor (DSP), a field-programmable gate array (FPGA), or an application specific integrated circuit (ASIC). A function of controller 130 may be implemented only by hardware or may be implemented by a combination of hardware and software. Controller 130 reads out data and programs stored in storage 120 to perform various arithmetic processing and thus implements predetermined functions. In the present exemplary embodiment, controller 130 includes area searcher 131, feature quantity extractor 132, and collator 133 as functional constituents.

Area searcher 131 searches a first collation area including a first subject similar to the whole of the search target and a second collation area including a second subject similar to the feature portion of the search target in each of the captured images generated by monitoring cameras 20. In the present exemplary embodiment, the first subject is an entire outer shape of the vehicle included in the captured image, and the first collation area is referred to as an "entire area". The second subject is a feature portion specific to the vehicle, and the second collation area is referred to as a "local area". Area searcher 131 decides an area to be searched, for example, based on query information Q12 stored in storage 120, or based on an instruction from a user via input unit 140. Hereinafter, an image (image in the entire area) including the entire outer shape of the vehicle is also referred to as an "entire image", and an image (image in the local area) including only the feature portion of the vehicle is also referred to as a "local image". Feature quantity extractor 132 extracts each of a feature quantity of the entire image and a feature quantity of the local image. Collator 133 collates the feature quantities of the entire image and local image of the vehicle in the captured image with feature quantities of the entire image and local image of the vehicle that is the search target, and calculates a similarity between the vehicle as the search target and the vehicle shown in the captured image.

Input unit 140 is a user interface that receives a variety of operations by a user. Input unit 140 can be implemented by a touch panel, a keyboard, buttons, switches, or any combination of these.

Output unit 150 outputs, as a collation result, the similarity between the vehicle as the search target and the vehicle shown in the captured image. Output unit 150 is, for example, a display unit configured with a liquid crystal display or an organic electroluminescence (EL) display. When output unit 150 is the display unit, output unit 150 displays the collation result on a screen of the display unit. Output unit 150 may be a communication unit that transmits the collation result to the external instrument. When output unit 150 is the communication unit, output unit 150 includes the circuit that communicates with the external instrument in conformity with a predetermined communication standard (for example, LAN, Wi-Fi (registered trademark), Bluetooth (registered trademark), USB, and HDMI (registered trademark)).

Figure 2:
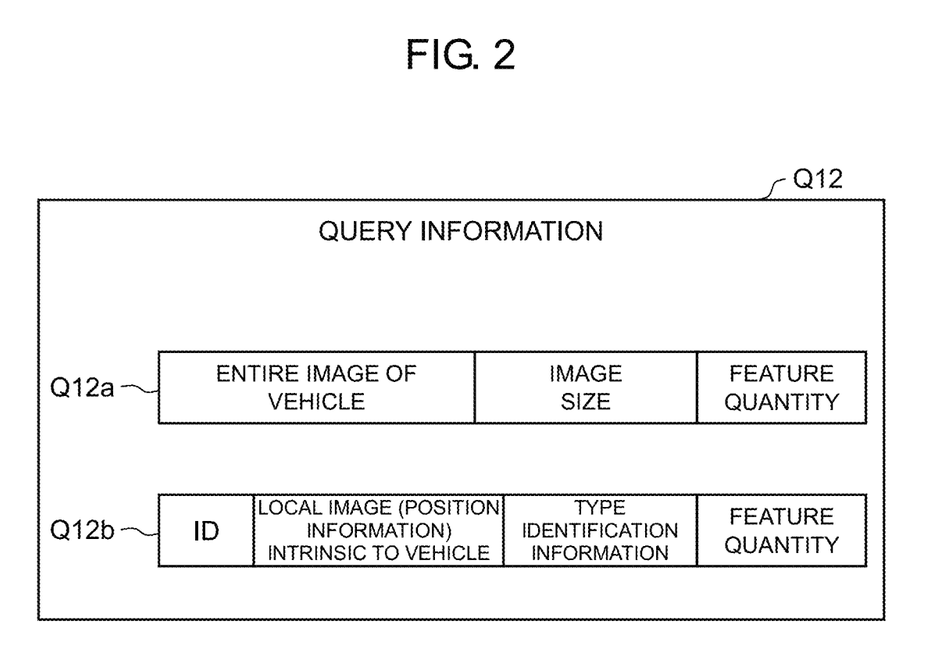
FIG. 2 is a diagram illustrating an example of query information.

FIG. 2 illustrates an example of query information Q12. Query information Q12 includes entire image information Q12a and local image information Q12b. Entire image information Q12a is information regarding the entire outer shape of the vehicle as the search target. Local image information Q12b is information regarding a plurality of the feature portions specific to the vehicle as the search target. The feature portion specific to the vehicle is such a portion that can assist in specifying the vehicle that is the search target. For example, the feature portion is a number plate, a logotype, clothes of a driver, and an advertisement, a pattern and characters drawn on a vehicle body.

Figure 3:
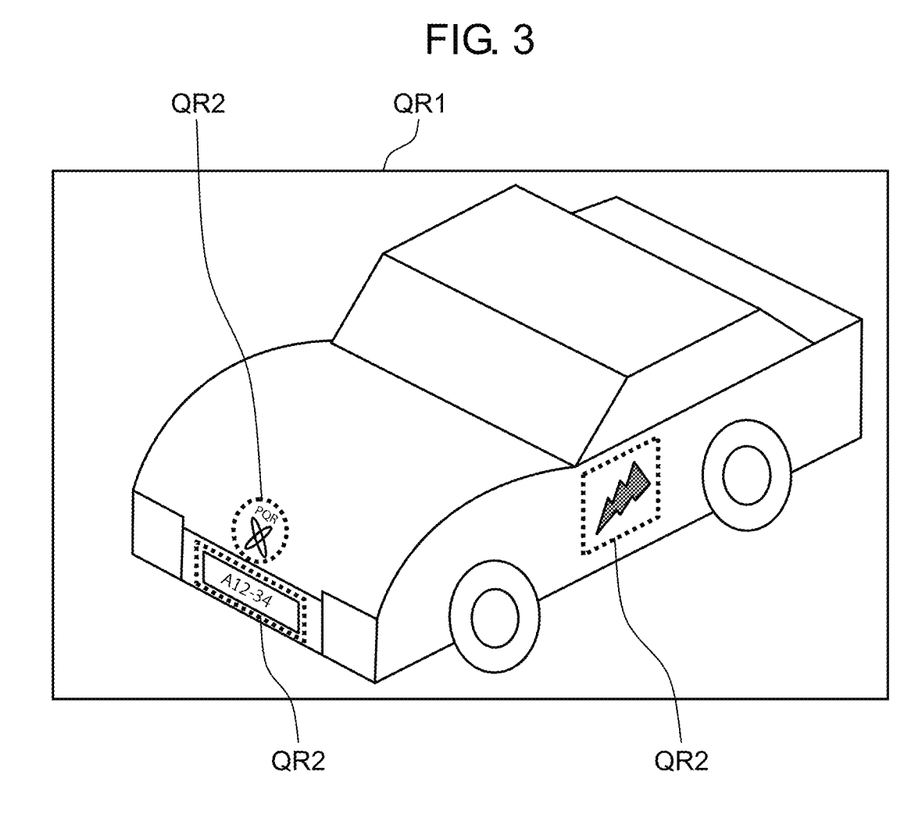
FIG. 3 is a view for describing an entire area and local area of a search target.

FIG. 3 is an example of an image of the vehicle as the search target, the image being included in query information Q12. FIG. 3 illustrates entire area QR1 and local areas QR2 of the vehicle. Entire area QR1 is an area including the entire outer shape of the vehicle. Local areas QR2 are areas including only the feature portions (number plate, logotype, pattern and the like) of the vehicle.

Entire image information Q12a of query information Q12 illustrated in FIG. 2 includes an image (entire image) of entire area QR1 as illustrated in FIG. 3. Entire image information Q12a further includes an image size of the entire image and the feature quantity of the entire image. Local image information Q12b includes images (local images) of local areas QR2 as illustrated in FIG. 3. Local image information Q12b may include position information for specifying positions of local areas QR2 in entire area QR1 in place of the images of local areas QR2. For example, the position information of each of local areas QR2 is coordinates of four corners of local area QR2 in entire area QR1, or a starting point, height and width of local area QR2 in entire area QR1. Local image information Q12b further includes an identification number (ID) for identifying each of the plurality of local images, a type identification information for identifying a type of each of the feature portions, and the feature quantity of the local image. The type identification information is, for example, numbers such as 1 (=number plate), 2 (=logotype), 3 (=advertisement), 4 (=other character string), and others.

1.2 Operation of Collation Device

1.2.1 Overall Operation

Figure 4:
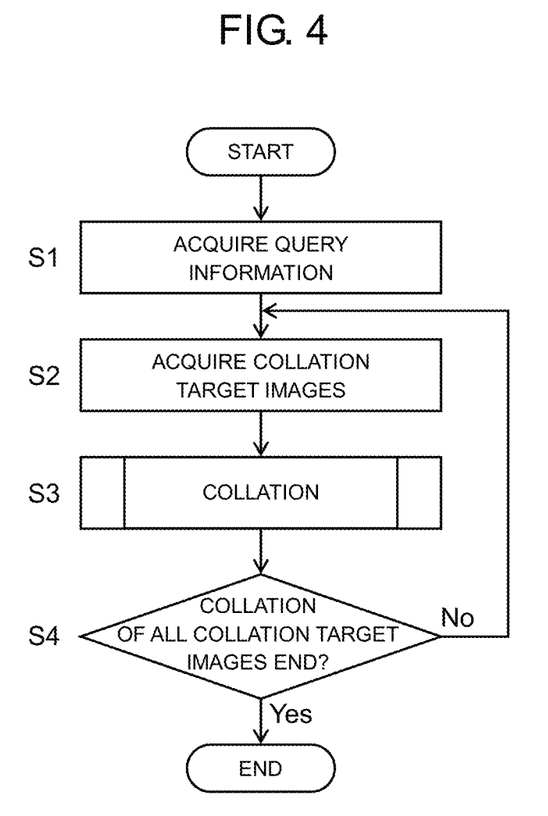
FIG. 4 is a flowchart for describing an overall operation of the collation device according to the first exemplary embodiment.
Figure 5:
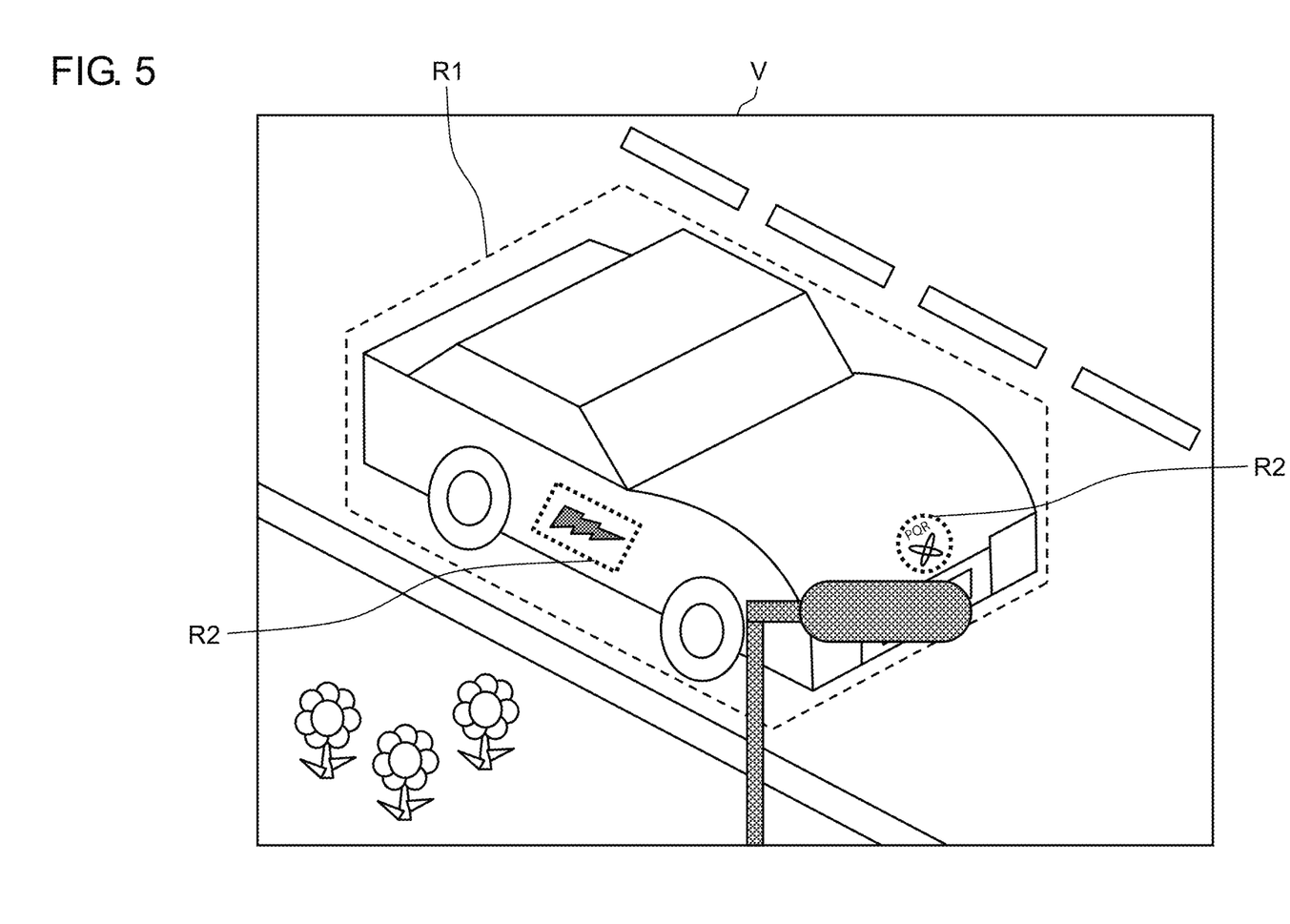
FIG. 5 is a view for describing an entire area and local area of a vehicle, which are extracted from a captured image.

An overall operation of collation device 10 will be described with reference to FIGS. 4 and 5. FIG. 4 is a flowchart for describing an overall operation of controller 130 of collation device 10. FIG. 5 illustrates an example of captured image v generated by monitoring camera 20.

In processing illustrated in FIG. 4, controller 130 selects, as collation target images, captured images to be collated with query information Q12 from among the captured images generated by the plurality of monitoring cameras 20. For example, the user designates monitoring cameras 20 and imaging dates via input unit 140, whereby the collation target images are selected.

Controller 130 reads out query information Q12 stored in storage 120, thereby acquiring query information Q12 (51). Controller 130 acquires the captured images which are the collation target images via image acquisition unit 110 (S2). For example, controller 130 acquires captured image v as illustrated in FIG. 5. Controller 130 collates captured image v with images of the search target included in query information Q12 (S3). Controller 130 determines whether the collation of all the collation target images is ended (S4). When the collation of all the collation target images is not ended, then the operation returns to step S2. Controller 130 repeats step S2 to S4 until the collation of all the collation target images is ended. When the collation of all the collation target images is ended, the processing illustrated in FIG. 4 is ended.

1.2.2 Collation Processing

The collation is implemented using the captured images themselves and the image of the search target itself without reading out numbers from the captured images. The collation is implemented by comparing the images with each other. In this way, it is possible to collate the search target and the captured images with each other, for example, even if characters cannot be captured from the captured images or the characters are shielded by occlusion. In this way, the collation opportunities are increased. Hence, even if the characters themselves cannot be captured, the collation result can be output. For example, even if the characters and numbers themselves of the number plate of the vehicle cannot be read due to a low resolution, occlusion and others, for example, the similarities can be calculated by the comparison between the images themselves in accordance with the collation by the images themselves.

Figure 6:
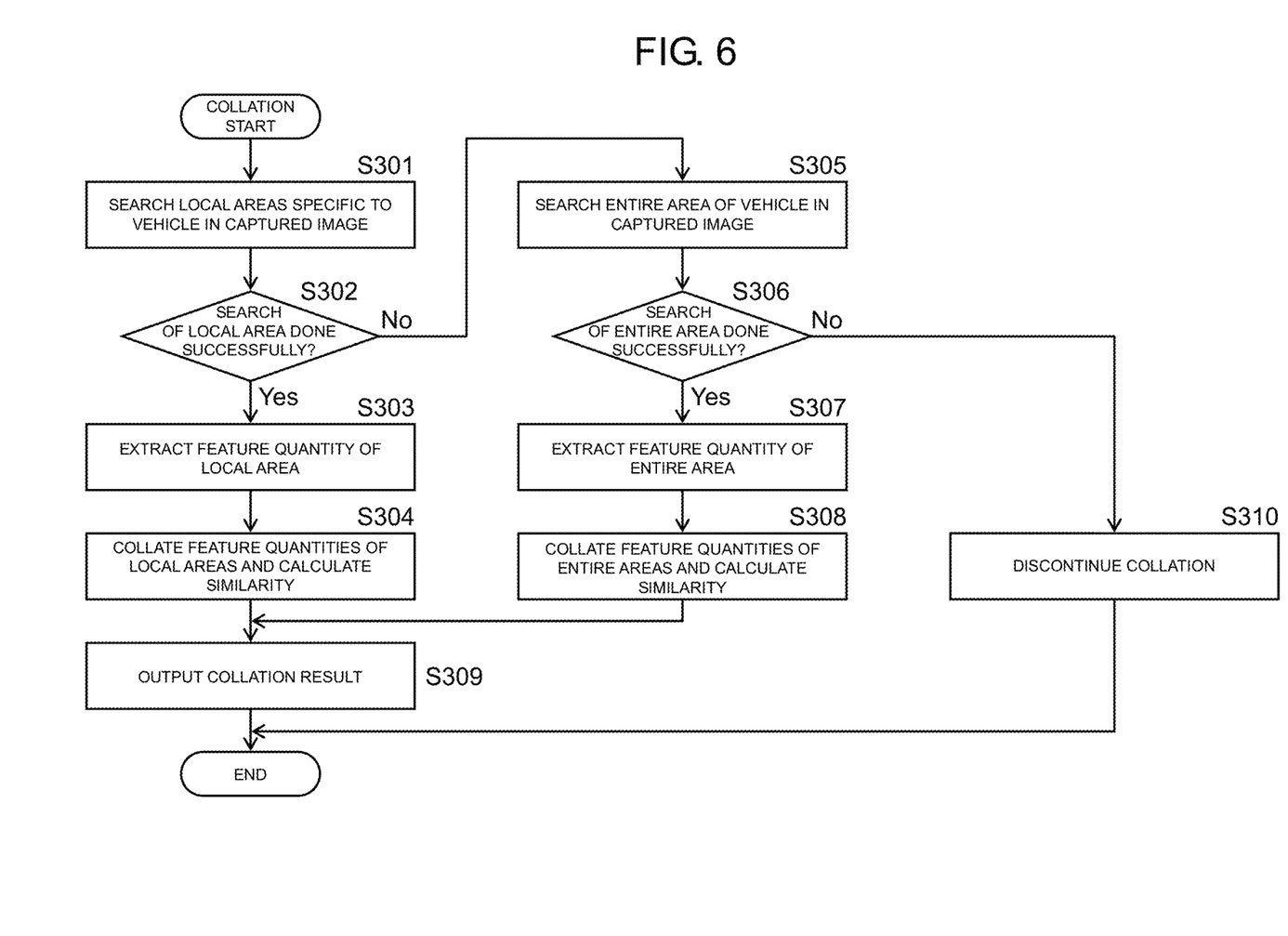
FIG. 6 is a flowchart for describing collation processing of the collation device according to the first exemplary embodiment.

FIG. 6 illustrates details of the collation processing (step S3 in FIG. 4). In captured image v, area searcher 131 searches local areas R2 including only the feature portions specific to the vehicle in the captured image based on query information Q12 (S301). For example, if the type identification information of local image information Q12b is "1" indicating the number plate, then area searcher 131 searches an area assumed to be the number plate from captured image v. Such an area search is performed by image recognition. In the image recognition, for example, a technique using "deep learning" or "hand-crafted feature quantity" may be used. For example, in the case of the deep learning, a neural network model that has already learned is used. The neural network model may be acquired from a server and stored in storage 120. In the case of searching the number plate, the captured image is input to a neural network for detecting the number plate, and the area of the number plate is acquired. Likewise, in the case of searching the logotype, the captured image is input to a neural network for detecting the logotype, and the area of the logotype is acquired. In the case of searching the advertisement, the captured image is input to a neural network for detecting the advertisement, and the area of the advertisement is acquired. Alternatively, the captured image may be input to one network that outputs the number plate, the logotype, the advertisement and others as different classes, and the areas of the respective classes may be acquired. In the case of the hand-crafted feature quantity, the area of the number plate, the area of the logotype, the area of the advertisement, and others are acquired using feature quantities written from image information such as brightness, color and shape. Area searcher 131 determines whether the search of each of local areas R2 is done successfully (S302).

When the search of local area R2 is done successfully (Yes in S302), feature quantity extractor 132 specifies local area R2 as an area to be collated, and extracts the feature quantity of the image in local area R2 (S303). The feature quantity is, for example, a numerical value, or a vector represented by an array of numbers. The feature quantity can be acquired by the above-mentioned technique of the deep learning or the hand-crafted feature quantity. Collator 133 collates the feature quantity of local area R2 of captured image v with a feature quantity of an image of local area QR2 of query information Q12, and calculates a similarity between the feature portion of the vehicle as the search target and the feature portion of the vehicle shown in captured image v (S304). For example, collator 133 calculates the similarity based on the vectors which are the feature quantities. The similarity is, for example, a numerical value that indicates a degree of similarity and remains within a range of 0% to 100%. Collator 133 defines that the similarity between the feature portions corresponds to a similarity between the vehicles, and determines that the vehicle shown in the captured image is the vehicle as the search target based on the similarity. For example, when the degree of the calculated similarity is more than or equal to a predetermined value, collator 133 determines that the vehicle shown in the captured image is the vehicle as the search target. That is, collator 133 specifies the captured image under collation as the captured image including the search target. Note that the similarity may be a binary value indicating whether the feature portion of the vehicle as the search target and the feature portion of the vehicle in the captured image coincide with each other. Collator 133 outputs a collation result to output unit 150 (S309). On the screen, collator 133 may display, for example, the calculated similarity as a collation result together with an image in which a frame showing local area R2 is added to captured image v.

When the search of local area R2 ends in failure (No in S302), area searcher 131 searches entire area R1 including the entire outer shape of the vehicle in captured image v (S305). For example, area searcher 131 extracts an area assumed to be the vehicle by the image recognition using the above-mentioned technique of the deep learning or the hand-crafted feature quantity. Area searcher 131 determines whether the search of entire area R1 is done successfully (S306).

When the search of entire area R1 is done successfully (Yes in S306), feature quantity extractor 132 specifies entire area R1 as an area to be collated, and extracts the feature quantity of the image in entire area R1 (S307). The feature quantity is, for example, a numerical value or a vector. The feature quantity is acquired by the above-mentioned technique of the deep learning or the hand-crafted feature quantity. Collator 133 collates the feature quantity of entire area R1 in the captured image with a feature quantity of an image of entire area QR1 of query information Q12, and calculates a similarity between the entire outer shape of the vehicle as the search target and the entire outer shape of the vehicle shown in captured image v (S308). The similarity is a numerical value that indicates a degree of similarity and remains within a range of 0% to 100%. Collator 133 defines that the similarity between the entire outer shapes corresponds to a similarity between the vehicles, and determines that the vehicle shown in the captured image is the vehicle as the search target based on the similarity. For example, when the degree of the calculated similarity is more than or equal to a predetermined value, collator 133 determines that the vehicle shown in the captured image is the vehicle as the search target. That is, collator 133 specifies the captured image under collation as the captured image including the search target. Note that the similarity may be a binary value indicating whether the entire outer shape of the vehicle as the search target and the entire outer shape of the vehicle in the captured image coincide with each other. Collator 133 outputs a collation result to output unit 150 (S309). On the screen, collator 133 may display, for example, the calculated similarity as a collation result together with an image in which a frame showing entire area R1 is added to captured image v.

When the search of local area R2 and the search of entire area R1 end in failure (No in S306), collator 133 determines that no vehicle as the search target is shown in the captured image under collation at present, and discontinues the collation of the captured image (S310).

In the present exemplary embodiment, plural pieces of local image information Q12b may be included in query information Q12. For example, local image information Q12b regarding the number plate, the logotype, and the advertisement may be included in query information Q12. In this case, area searcher 131 searches plural types of local areas R2 based on type identification information of the plural pieces of local image information Q12b. Feature quantity extractor 132 extracts the feature quantity for each of all local areas R2 searched successfully. Collator 133 calculates the similarity between the vehicle as the search target and the vehicle shown in captured image v using the plurality of extracted feature quantities. The collation based on the plurality of feature quantities is performed, whereby accuracy of the collation can be enhanced. Any method for calculating the similarity based on the plurality of feature quantities may be applicable. For example, when the plural types of local areas R2 are searched successfully, collator 133 may calculate the similarity by any of the following methods (A) to (D) in step S304.

(A) Method Based on Majority Decision

The feature quantities of the images of respective local areas R2 in captured image v are collated with the feature quantities of the images of local areas QR2 in query information Q12 corresponding individually to the types of the feature portions. Then, the similarity between the vehicle as the search target and the vehicle in the captured image is calculated according to the number of determination results that the vehicle as the search target and the vehicle in the captured image are the same and the number of determination results that the vehicle as the search target and the vehicle in the captured image are different from each other. For example, when the number of the determination results that the vehicle shown in the captured image and the vehicle as the search target are the same is larger than the number of the determination results that the vehicle shown in the captured image and the vehicle as the search target are not the same, it is determined that the vehicle shown in the captured image and the vehicle as the search target are the same.

(B) Method Based on Degree of Reliability

Degrees of reliability are preset according to the types of the feature portions. For example, the degrees of reliability are set higher in order of the number plate, the advertisement, and the logotype. In another example, the degrees of reliability are set according to search success rates for local areas R2. Then, the similarity between the vehicle as the search target and the vehicle in the captured image is decided based on collation using the feature quantity of the feature portion having the highest degree of reliability among the plurality of feature portions searched from captured image v. In still another example, it is defined that the degrees of reliability correspond to the similarities, the similarities are calculated using the respective feature quantities of the plurality of searched feature portions, and the highest similarity among the calculated similarities is determined as the similarity between the vehicle as the search target and the vehicle in the captured image.

(C) Method by Learning

A model is generated in advance by machine learning using a plurality of results of collating the feature portions, and the similarity between the vehicle as the search target and the vehicle in the captured image is calculated using the model.

(D) Method of Generating and Using New Vector

A combined vector obtained by combining the feature quantities of the respective feature portions with one another is newly generated. For example, the respective feature quantities are combined with one another in an order based on the types of the feature portions. At this time, the respective feature quantities may be multiplied by weights corresponding to the types of the feature portions or the search success rates of the feature portions. Moreover, methods of combining the respective feature quantities with one another may be learned. Further, weighted addition averaging may be used. Moreover, a neural network that outputs a new vector suitable for the collation from the vectors of the respective feature portions may be learned, and the obtained new vector may be used. By collation using the new vector generated by such a method, the similarity between the vehicle as the search target and the vehicle in the captured image is calculated.

1.3 Effects and Supplements

Collation device 10 according to the present exemplary embodiment includes: storage 120 that stores the image (an example of a search target image) of entire area QR1 of the search target; image acquisition unit 110 (an example of an acquisition unit) that acquires the captured images generated by monitoring cameras 20 (an example of imaging devices); and controller 130 that determines whether the search target is included in the captured images. In the present exemplary embodiment, the search target is a vehicle. In any of the captured images, controller 130 searches out at least one of entire area R1 (an example of a first collation area) including the entire outer shape (an example of a subject similar to at least a part of the search target) of the vehicle and local areas R2 (an example of second collation areas) including the feature portions (an example of subjects similar to at least a part of the search target) of the vehicle. In response to a result of the search, controller 130 selects at least one of entire area QR1 and local areas QR2 in the search target image, and collates the selected area with the captured image, thereby specifying whether the search target is included in the captured image.

Collation device 10 of the present exemplary embodiment performs the collation based on the feature quantity of entire area QR1 in the image of the search target and the feature quantities of local areas QR2, and based on the feature quantity of entire area R1 and the feature quantities of local areas R2 in the captured image. In accordance with the present exemplary embodiment, the collation is performed using both of the entire area and the local areas, and accordingly, the collation performance is enhanced. Moreover, the collation opportunities are increased.

Further, controller 130 does not perform collation by numbers or characters, but performs the collation by the images. Therefore, for example, when the resolution of the captured image is low, or when the captured image is generated in a dark state of lighting, the collation can be performed using the captured image. Hence, the collation opportunities can be prevented from being reduced. In this way, the collation performance is enhanced. In the present exemplary embodiment, information (for example, shape) for which comparison by numbers and characters is impossible can be used for the collation.

When one of local areas R2 in the captured image can be specified by the search, controller 130 collates local area R2 in the captured image with local area QR2 in the image of the search target. Then, when local area R2 cannot be specified from the captured image but entire area R1 can be specified from the captured image, controller 130 collates entire area R1 in the captured image with entire area QR1 in the image of the search target. As described above, collation device 10 according to the present exemplary embodiment performs the collation using the images of the entire area and the local area. Hence, the collation can be performed when either one of entire area R1 and local area R2 can be searched in the captured image. Therefore, the collation opportunities can be prevented from being reduced according to the captured image. As described above, in accordance with collation device 10 of the present disclosure, the collation opportunities can be prevented from being reduced according to the captured image, and accordingly, the collation performance is enhanced.

In specifying whether the search target is included in the captured image, controller 130 calculates at least one of the similarity of the entire outer shape of the vehicle and the similarities of the feature portions of the vehicle. In this way, the captured image including the search target can be specified precisely from among the plurality of captured images.

When the search target is the vehicle, the number plate is special information that enables only the vehicle to be specified uniquely. Hence, an area of the number plate may be first searched, and collation by the number plate may be attempted. Then, when the area of the number plate cannot be specified and the collation by the number plate cannot be performed, the entire image and local images other than the image of the number plate may be used. For example, when the search of the number plate is attempted and ends in failure, the entire area of the vehicle may be searched, and the collating using the entire image of the vehicle may be implemented. Alternatively, when the search of the number plate is attempted and ends in failure, search of another local area may be attempted, and then the search of the entire area of the vehicle may be implemented when the search of the other local area ends in failure. In this way, collation can be performed using preferentially the information of the number plate, the information having higher accuracy, and accordingly, the collation performance (collation efficiency in particular) can be enhanced. The present exemplary embodiment illustrates the case where the search target is a vehicle. However, even if the search target is not a vehicle, a local area that enables an object including the local area to be uniquely identified may be first searched, and an image of the local area may be used for the collation. In this case, the local area concerned is like the number plate in the vehicle.

Note that the entire image and the local image may include areas shielded by occlusion. That is, a part of the entire outer shape of the search target does not have to be shown in the entire image. Moreover, a part of the feature portion does not have to be shown in the local image.

Second Exemplary Embodiment

A second exemplary embodiment is different from the first exemplary embodiment in operation of collation device 10. In the first exemplary embodiment, the collation is performed based on the feature quantity of local area R2 when the search of local area R2 is done successfully in captured image v, and the collation is performed based on the feature quantity of entire area R1 when the search of entire area R1 is done successfully in captured image v. In the present exemplary embodiment, the collation is performed based on the feature quantities of both of entire area R1 and each of local areas R2 when the search of both of entire area R1 and local area R2 is done successfully. A configuration of collation device 10 according to the present exemplary embodiment is identical to the configuration illustrated in FIG. 1 in the first exemplary embodiment.

Figure 7:
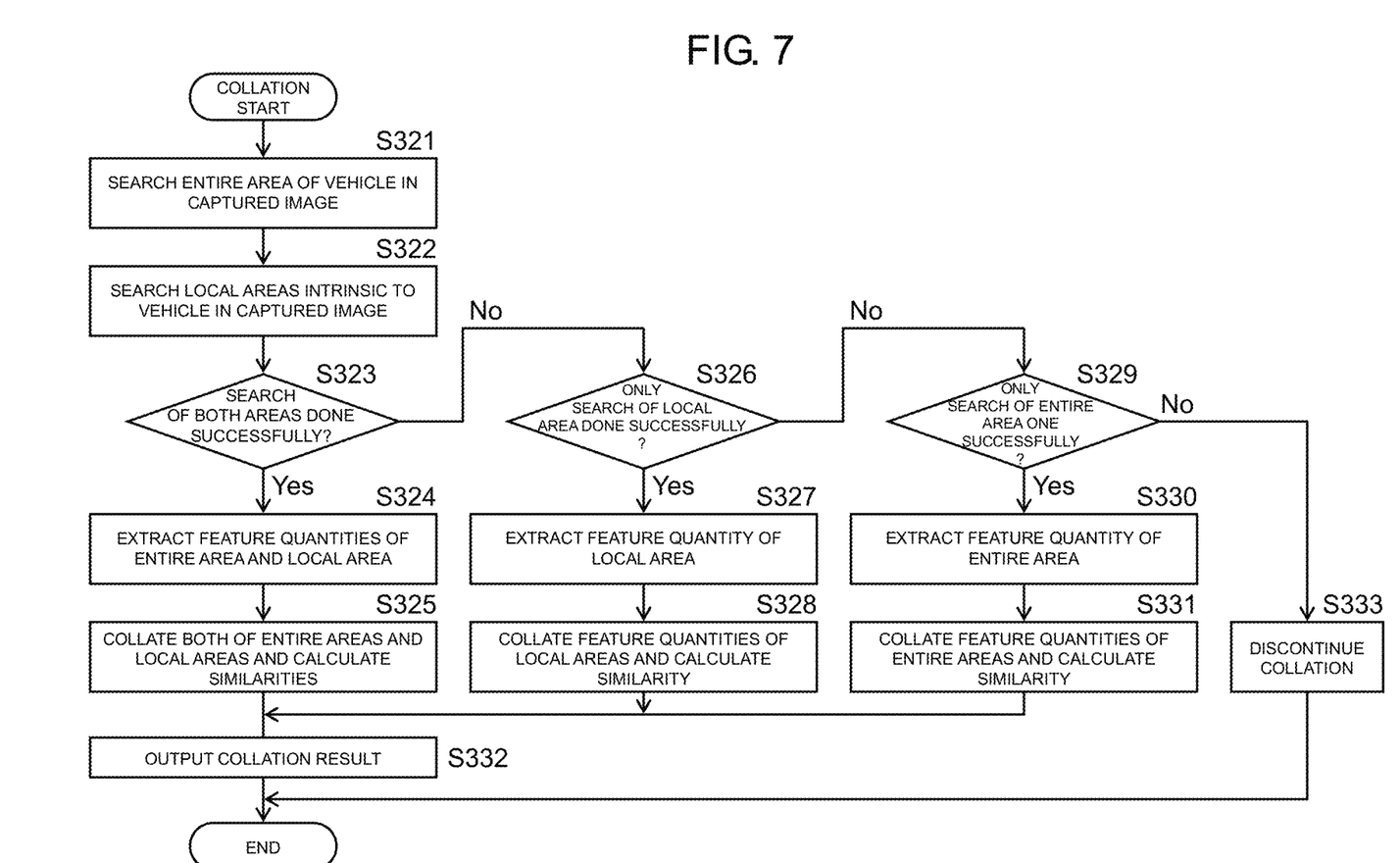
FIG. 7 is a flowchart for describing collation processing of a collation device according to a second exemplary embodiment.

FIG. 7 illustrates collation processing (details of step S3 in FIG. 4) in the second exemplary embodiment. Area searcher 131 searches entire area R1 including the entire outer shape of the vehicle in captured image v based on query information Q12 or based on an instruction from the user via input unit 140 (S321). In captured image v, area searcher 131 searches each of local areas R2 including only the feature portions of the vehicle based on query information Q12 (S322).

Area searcher 131 determines whether the search of both of entire area R1 and local area R2 is done successfully (S323). When the search of both is done successfully (Yes in S323), feature quantity extractor 132 specifies both of entire area R1 and local area R2 as areas to be collated, and extracts the feature quantities individually from the image in entire area R1 and the image in local area R2 (S324). Collator 133 collates the feature quantities of the images of entire area R1 and local area R2 in the captured image with the feature quantities of entire area QR1 and local area QR2 in the image of the vehicle as the search target. Then, collator 133 calculates the similarities between the entire outer shape and feature portion of the vehicle as the search target and the entire outer shape and feature portion of the vehicle shown in captured image v (S325). In this case, it is defined that the similarities of the entire outer shape and the feature portion correspond to the similarity of the vehicle. Collator 133 outputs a collation result based on the calculated similarities to output unit 150 (S332).

When the search of at least either one of entire area R1 and local area R2 ends in failure (No in S323), area searcher 131 determines whether only the search of local area R2 is done successfully (S326).

When only the search of local area R2 is done successfully (Yes in S326), feature quantity extractor 132 specifies local area R2 as an area to be collated, and extracts the feature quantity from the image in local area R2 (S327). Collator 133 collates the feature quantity of local area R2 of captured image with the feature quantity of the image of local area QR2 of the search target, and calculates a similarity between the feature portion of the vehicle as the search target and the feature portion of the vehicle shown in captured image v (S328). In this case, it is defined that the similarity of the feature portion corresponds to the similarity of the vehicle. Collator 133 outputs a collation result based on the calculated similarity to output unit 150 (S332).

When the search of local area R2 ends in failure (No in S326), area searcher 131 determines whether only the search of entire area R1 is done successfully (S329). When only the search of entire area R1 is done successfully (Yes in S329), feature quantity extractor 132 specifies entire area R1 as an area to be collated, and extracts the feature quantity from the image in entire area R1 (S330). Collator 133 collates the feature quantity of entire area R1 in the captured image with the feature quantity of the image of entire area QR1 of the search target, and calculates the similarity between the entire outer shape of the vehicle as the search target and the entire outer shape of the vehicle shown in captured image v (S331). In this case, it is defined that the similarity of the entire outer shape corresponds to the similarity of the vehicle. Collator 133 outputs a collation result based on the calculated similarity to output unit 150 (S332).

When the search of both of entire area R1 and the local area R2 ends in failure (No in S329), collator 133 determines that no vehicle as the search target is shown in the captured image under collation at present, and discontinues the collation of the captured image (S333).

The present exemplary embodiment is identical to the first exemplary embodiment except that the collation is performed based on the feature quantities of both of entire area R1 and local area R2 when the search of both of entire area R1 and local area R2 from the captured image is done successfully (S325). Hence, the searches of the areas (S321 and S322), the extractions of the feature quantities (S324, S327, S330), the collation of the local areas (S328), the collation of the entire areas (S331), and the output of the collation result (S332) in the present exemplary embodiment can be performed by the same methods as those for the searches of the areas (S301 and S305), the extractions of the feature quantities (S303 and S307), the collation of the local areas (S304), the collation of the entire areas (S308), and the output of the collation result (S309) in the first exemplary embodiment.

The calculation of the similarities when the collation is performed using both of the entire area and the local area in step S325 can be performed by a method similar to any of the following methods mentioned above in the first exemplary embodiment. For example, the methods are: (A) Method based on majority decision; (B) Method based on degree of reliability; (C) Method by learning; and (D) Method of generating and using new vector.

As described above, in collation device 10 according to the present exemplary embodiment, when both of entire area R1 (an example of the first collation area) of local area R2 (an example of the second collation area) of the vehicle can be specified from the captured image by the search, controller 130 collates entire area R1 and local area R2 in the captured image with entire area QR1 and local area QR2 in the image of the search target. When entire area R1 cannot be specified but local area R2 can be specified, controller 130 collates local area R2 in the captured image with local area QR2 in the image of the search target. When entire area R1 can be specified from the captured image but local area R2 cannot be specified from the captured image, controller 130 collates entire area R1 in the captured image with entire area QR1 in the image of the search target. As described above, in accordance with the present exemplary embodiment, the collation is performed using all the feature quantities of the extracted areas, and therefore, the collation performance is enhanced.

In accordance with the present exemplary embodiment, the collation is performed using both of the entire image of the search target and the local image including the feature portion specific to the search target, whereby candidates for the captured image showing the search target can also be specified precisely in a plurality of the captured images. That is, the accuracy of the collation can be enhanced by combining the collation based on the entire image and the collation based on the local image with each other. For example, in an example of comparing the number plates with each other, when two vehicles indicate similarities similar to that of the search target, if one of the vehicles has the same color as that of the vehicle as the search target, and the other vehicle has a different color from that of the vehicle as the search target, collation using the number plates and collation using information about the entire vehicles are mixed with each other, whereby the similarity in the former case can be increased relatively. In this way, when the number plate and the color of the vehicle in the captured image are the same as those of the search target, the captured image can be specified to be the image showing the search target.

Third Exemplary Embodiment

In the first exemplary embodiment, query information Q12 is prestored in storage 120. In the present exemplary embodiment, collation device 10 generates query information Q12 based on the captured image acquired by image acquisition unit 110. For example, collation device 10 generates query information Q12 from at least one captured image among the plurality of captured images generated by the plurality of monitoring cameras 20, and collates another captured image that is not used for generating query information Q12 with query information Q12.

Figure 8:
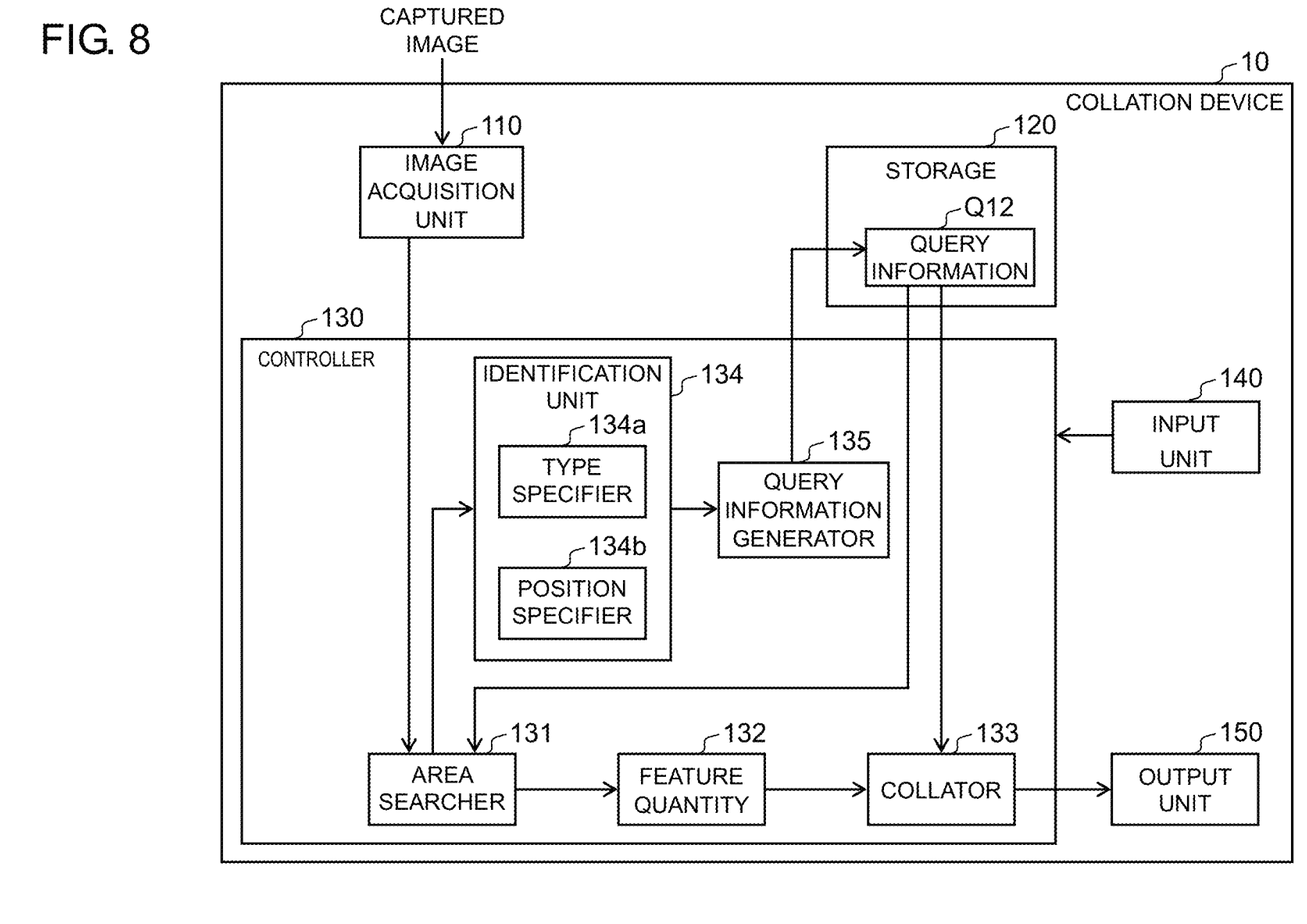
FIG. 8 is a diagram illustrating a configuration of a collation device according to a third exemplary embodiment.

FIG. 8 illustrates a configuration of collation device 10 according to the third exemplary embodiment. In the present exemplary embodiment, controller 130 further includes identification unit 134 and query information generator 135 as functional constituents in addition to the configuration of the first exemplary embodiment.

Identification unit 134 includes type specifier 134*a* and position specifier 134*b*. Type specifier 134*a* specifies a type of the feature portion shown in the area searched by area searcher 131. The type of the feature portion is, for example, a number plate, a logotype, an advertisement, a pattern, a character, or clothes of a driver. Position specifier 134*b* specifies a position of local area R2, which is searched by area searcher 131, in entire area R1. For example, position specifier 134*b* specifies coordinates of four corners of local area R2 in entire area R1, or a starting point, height and width of local area QR2 in entire area QR1.

Query information generator 135 generates query information Q12 and stores generated query information Q12 in storage 120 based on entire area R1 including the entire outer shape of the search target searched by area searcher 131, the type of the feature portion specific to the search target specified by type specifier 134*a*, and the position of local area R2, which is specified by position specifier 134*b*. Query information generator 135 may include the image of local area R2 searched by area searcher 131 in query information Q12 in place of the position information of local area R2.

Figure 9:
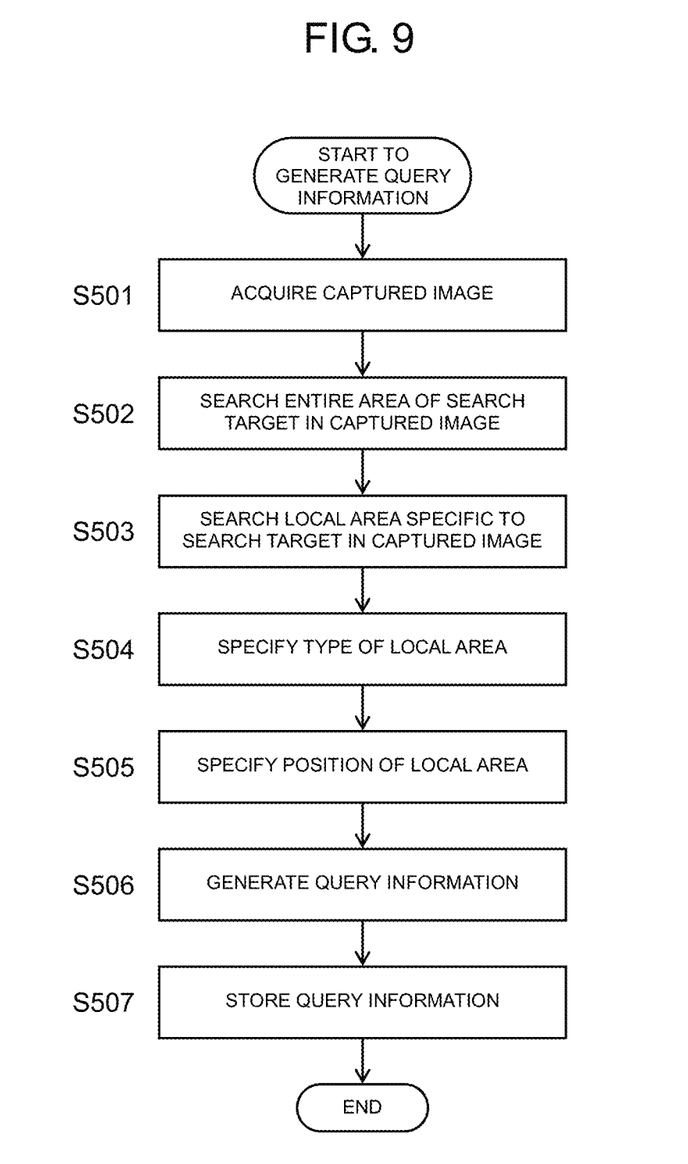
FIG. 9 is a flowchart for describing query information generation processing of the collation device according to the third exemplary embodiment.

FIG. 9 is a flowchart illustrating the generation of query information Q12 by controller 130 in the present exemplary embodiment. The generation of query information Q12, which is illustrated in FIG. 9, is performed before performing the collation operation illustrated in FIG. 4.

Area searcher 131 acquires each of the captured images via image acquisition unit 110 (S501). Area searcher 131 searches entire area R1 including the entire outer shape of the search target from the captured image (S502). Area searcher 131 searches the local area indicating the feature portion specific to the search target from the captured image (S503). All or part of the search target to be searched and the feature portion to be searched may be automatically determined from the captured image by area searcher 131, or may be designated in advance by the user via input unit 140. Area searcher 131 searches the entire area and the local area, for example, by the above-mentioned image recognition.

Type specifier 134*a* specifies a type of the feature portion shown in local area R2 searched by area searcher 131 (S504). For example, type specifier 134*a* specifies the type of the feature portion by determining brightness, color, shape, and others. Position specifier 134*b* specifies a position of local area R2, which is searched by area searcher 131, in entire area R1 (S505). Query information generator 135 generates query information Q12 (S506). For example, query information generator 135 generates entire image information Q12*a* including the image of entire area R1 of the search target searched by area searcher 131, and an image size of the image of entire area R1. Moreover, query information generator 135 generates local image information Q12*b* including the position information indicating the position of local area R2 specified by position specifier 134*b*, and the type identification information indicating the type of the feature portion, which is specified by type specifier 134*a*.

Query information generator 135 stores, in storage 120, query information Q12 including entire image information Q12*a* and local image information Q12*b* (S507). Note that, before query information generator 135 stores query information Q12 in storage 120, the user may be asked whether to store generated query information Q12, for example, via output unit 150.

The image itself of local area R2 may be included in local image information Q12*b* in place of the position information of local area QR2. In this case, the step (S505) of specifying the position of local area R2 may be omitted.

At predetermined timing before or after storing query information Q12, the feature quantities of entire area R1 and local area R2, which are extracted by feature quantity extractor 132, may be added to query information Q12.

A plurality of the captured image may be used for generating query information Q12. After generating query information Q12, collation device 10 finds out the search target from the captured images that are not used for generating query information Q12. For example, collation device 10 generates query information Q12 from the captured image generated by certain monitoring camera 20, and using generated query information Q12, finds out the search target from the captured images generated by other monitoring cameras 20. Note that the captured image for generating query information Q12 and the captured images for finding out the search target may be generated by the same monitoring camera 20.

As described above, in the present exemplary embodiment, image acquisition unit 110 acquires the plurality of captured images from one or more monitoring cameras 20. Controller 130 generates query information Q12 based on at least one of the plurality of captured images, and stores generated query information Q12 in storage 120. Moreover, controller 130 specifies the captured image including the search target from among the captured images that are not used for generating query information Q12 in the plurality of captured images. In this way, for example, collation device 10 can find out a vehicle shown in the captured image of certain monitoring camera 20 from the captured images of other monitoring cameras 20.

Other Exemplary Embodiments

The exemplary embodiments have been described above as illustrations of the technique disclosed in the present application. However, the technique in the present disclosure is not limited to the exemplary embodiments and is applicable to exemplary embodiments appropriately subjected to changes, replacements, additions, omissions, or the like. Therefore, other exemplary embodiments will be illustrated below.

In the above-described exemplary embodiments, the description is made of the example where query information Q12 includes the feature quantity of entire area QR1 and the feature quantity of local area QR2 in the image of the search target. However, the feature quantities do not have to be included in query information Q12. In this case, when the collation is performed, for example, when the feature quantities about the captured image are extracted (steps S303 and S307 in FIG. 6), the feature quantity of entire area QR1 and the feature quantity of local area QR2 in the image of the search target included in query information Q12 may be extracted.

In the above-described exemplary embodiments, query information Q12 stored in storage 120 may be updated based on the captured image. For example, new local image information Q12b is added to query information Q12. Specifically, based on the acquired captured image, area searcher 131 decides local area R2 to be searched, and searches local area R2. Identification unit 134 specifies the position of local area R2 and the type of the feature portion. In the collation, collator 133 refers to query information Q12, and uses local area R2 including the same type of feature portion as the type of the feature portion of the search target. Then, when collator 133 determines that the vehicle shown in the captured image and the vehicle as the search target included in query information Q12 are the same, if an image of new local area R2 that is not included in query information Q12 is searched by area searcher 131, then information regarding new local area R2 is added as new local image information Q12b to query information Q12. In this way, local image information Q12b in query information Q12 is increased, and accordingly, opportunities to collate the captured image with local image information Q12b are increased. Moreover, types of local image information Q12b are increased, whereby the precision of the collation is further improved. Note that local image information Q12b indicating the same type of the feature portion may be added to query information Q12. For example, an orientation of the feature portion, a lighting condition, an amount of occlusion, or the like sometimes differs from that of the already stored local image depending on the captured image, for example, depending on the position of monitoring camera 20. Hence, even in the same type of the feature portion, when the orientation of the feature portion, the lighting condition, the amount of occlusion, or the like differs, the local image may be added to query information Q12. For example, local images obtained from different captured images may be added to query information Q12. In this, way, the precision of the collation is enhanced. Moreover, in the above-described exemplary embodiments, query information Q12 includes one entire image, but may be caused to include a plurality of the entire images. For example, also in the entire image, an orientation of the vehicle, the lighting condition, the amount of occlusion, or the like sometimes differs from that of the already stored entire image. Hence, when the orientation of the vehicle, the lighting condition, the amount of occlusion, or the like differs, the entire image may be added to query information Q12. For example, entire images obtained from different captured images may be added to query information Q12. In this way, the precision of the collation can be enhanced.

In the above-described exemplary embodiments, the description has been given of the example of specifying the captured image showing the same vehicle as the search target from among the plurality of collation target images. However, as such a candidate for the image including the search target, a captured image including a vehicle similar to the vehicle as the search target may be specified. For example, when the similarity is more than or equal to a predetermined value, it may be determined that the vehicle in the captured image is similar to the vehicle as the search target, and the captured image may be specified as such an image including the vehicle similar to the vehicle as the search target. In this case, a plurality (m pieces) of captured images including the vehicle similar to the vehicle as the search target may be extracted from a plurality (n pieces) of the collation target images (m<n). For example, m pieces of the captured images may be extracted in a descending order or the similarity. Moreover, m pieces of the captured images including vehicles similar to the vehicle as the search target may be extracted from among n pieces of the collation target images. In this way, images likely to show the vehicle as the search target can be narrowed down from among an enormous number of the captured images, and accordingly, this way of extracting the captured images is extremely useful.

In the above-described exemplary embodiments, the description has been given of the example where controller 130 includes area searcher 131, feature quantity extractor 132, and collator 133. However, all or part of functions by area searcher 131, feature quantity extractor 132, and collator 133 may be integrated. For example, controller 130 may include such an image collator that executes the functions of all of area searcher 131, feature quantity extractor 132, and collator 133. The image collator may use a neural network model that directly outputs the similarity between the vehicle in the captured image and the vehicle as the search target upon receiving the captured image and the image of the search target. Also in this case, the image collator extracts entire area R1 and local area R2 from the captured image based on query information Q12, and collates entire area R1 and local area R2 of the vehicle in the captured image with entire area QR1 and local area QR2 of the vehicle as the search target. Moreover, query information Q12 does not have to include the feature quantity.

In the above-described exemplary embodiments, the case where the search target is the vehicle has been described. However, the search target is not limited to the vehicle. Any search target may be applicable. For example, the search target may be a motor cycle, a bicycle, or a person.

In the above-described exemplary embodiments, the description has been given of the case of implementing the collation processing using the images themselves. However, any collation method may be applicable without being limited to the collation of the images themselves. For example, when the collation target is a character in the number plate or the like, character information may be extracted from the image, and collation by character comparison may be implemented. Further, a plurality of collation methods such as the collation by the images themselves, and the collation by the characters may be used.

Outline of Exemplary Embodiments (1) A collation device of the present disclosure includes: a storage that stores a search target image showing a search target; an acquisition unit that acquires a captured image generated by an imaging device; and a controller that determines whether the search target is included in the captured image. The controller searches out a collation area in the captured image, the collation area including a subject similar to at least a part of the search target, and selects, depending on the collation area, at least one of a whole of the search target image and a part of the search target image, and collates the selected at least one with the captured image, thereby determining whether the search target is included in the captured image.

As described above, the collation according to the images, the collation using the image of the whole of the search target and such a partial image of the search target, is performed. Accordingly, the collation opportunities can be prevented from being reduced. Hence, the collation performance is enhanced.

(2) In the collation device according to (1), the part of the search target image may include a feature portion specific to the search target, and the collation area may include a first collation area including a first subject similar to the whole of the search target, and a second collation area including a second subject similar to the feature portion of the search target.

As described above, the collation according to the images, the collation using the image of the whole of the search target and the image of the feature portion, is performed. Accordingly, the collation performance is enhanced.

(3) In the collation device according to (2), the controller may collate the part of the search target image with the second collation area when the second collation area can be searched out by the search; and may collate the whole of the search target image with the first collation area when the second collation area cannot be searched out by the search but the first collation area can be searched out by the search.

As described above, the collation according to the images, the collation using the image of the whole of the search target and the image of the feature portion, is performed. Accordingly, the collation performance is enhanced.

(4) In the collation device according to (2), the controller may collate the whole of the search target image and the part of the search target image with the first collation area and the second collation area when both of the first collation area and the second collation area can be searched out by the search. Then, the controller may collate the part of the search target image with the second collation area when the first collation area cannot be searched out by the search but the second collation area can be searched out by the search, and may collate the whole of the search target image with the first collation area when the first collation area can be searched out by the search but the second collation area cannot be searched out by the search.

As described above, the collation according to the images, the collation using the image of the whole of the search target and the image of the feature portion, is performed. Accordingly, the collation performance is enhanced.

(5) In the collation device according to (2), in the determination as to whether the search target is included in the captured image, the controller may calculate at least one of a similarity between the whole of the search target and the first subject and a similarity between the feature portion of the search target and the second subject by the collation.

In this way, the captured image including the search target can be specified precisely.

(6) In the collation device according to (2), the controller may perform the collation based on a feature quantity of the whole of the search target image and a feature quantity of the part of the search target image, and a feature quantity in the first collation area of the captured image and a feature quantity in the second collation area of the captured image.

In this way, the captured image including the search target can be specified precisely.

(7) In the collation device according to (1), the acquisition unit may acquire a plurality of captured images from one or more imaging devices, and based on at least one of the plurality of captured images, the controller may generate the search target image and store the search target image in the storage, and may determine the captured image including the search target from among captured images that are not used for generating the search target image among the plurality of captured images.

(8) In the collation device according to (2), the search target may be a vehicle.

(9) In the collation device according to (8), the feature portion of the search target may include at least one of a number plate, a logotype, and an advertisement.

(10) In the collation device according to (9), the controller may search an area of the number plate in the captured image, and may search an area of a whole of the vehicle or a feature portion other than the number plate when the area of the number plate cannot be searched out by the search.

The number plate is unique information that enables the vehicle to be specified. Accordingly, priority is given to the collation by the number plate, whereby the collation performance and the collation efficiency are enhanced.

(11) A collation method according to the present disclosure acquires a search target image from a storage, the search target image showing a search target, acquires a captured image from an imaging device, the captured image being generated by the imaging device, searches out a collation area in the captured image, the collation area including a subject similar to at least a part of the search target; and selects, depending on the collation area, at least one of a whole of the search target image and the part of the search target image, collates the at least selected one with the captured image, and determining whether the search target is included in the captured image.

A computer readable medium according to the present disclosure contains program instructions that cause a computer to execute the collation method described above. Moreover, a recording medium according to the present disclosure stores the program described above.

The collation device and the collation method according to all the claims of the present disclosure are configured with, for example, cooperation between a program and a hardware resource such as a processor and a memory.

The collation device according to the present disclosure is useful, for example, as a device that finds out the search target from the plurality of captured images.

What is claimed is:

1. A collation device comprising:
a storage that stores a search target image showing a search target;
an acquisition unit that acquires a captured image generated by an imaging device; and
a controller that determines whether the search target is included in the captured image,
wherein the controller:
searches out a collation area in the captured image, the collation area including a subject similar to at least a part of the search target; and
selects, depending on the collation area, at least one of a whole of the search target image and a part of the search target image, and collates the selected at least one with the captured image so as to determine whether the search target is included in the captured image,
wherein the part of the search target image includes a feature portion specific to the search target, and
the collation area includes a first collation area including a first subject similar to the whole of the search target, and a second collation area including a second subject similar to the feature portion of the search target, and
wherein the controller:
collates the part of the search target image with the second collation area when the second collation area is searched out by the search; and
collates the whole of the search target image with the first collation area when the second collation area is not searched out by the search but the first collation area is searched out by the search.

2. The collation device according to claim 1, wherein, in the determination as to whether the search target is included in the captured image, the controller calculates at least one of a similarity between the whole of the search target and the first subject and a similarity between the feature portion of the search target and the second subject by the collation.

3. The collation device according to claim 1,
wherein the acquisition unit acquires a plurality of captured images from one or more imaging devices including the imaging device, and
the controller:
based on at least one of the plurality of captured images, generates the search target image and stores the search target image in the storage; and
determines the captured image including the search target from among captured images that are not used for generating the search target image among the plurality of captured images.

4. The collation device according to claim 1, wherein the search target is a vehicle.

5. The collation device according to claim 4, wherein the feature portion of the search target includes at least one of a number plate, a logotype, and an advertisement.

6. The collation device according to claim 5,
wherein the controller searches an area of the number plate in the captured image, and searches an area of a whole of the vehicle or a feature portion other than the number plate when the area of the number plate is not searched out by the search.

7. A collation device comprising:
a storage that stores a search target image showing a search target;
an acquisition unit that acquires a captured image generated by an imaging device; and
a controller that determines whether the search target is included in the captured image,
wherein the controller:
searches out a collation area in the captured image, the collation area including a subject similar to at least a part of the search target; and
selects, depending on the collation area, at least one of a whole of the search target image and a part of the search target image, and collates the selected at least one with the captured image so as to determine whether the search target is included in the captured image, and
wherein the part of the search target image includes a feature portion specific to the search target, and
the collation area includes a first collation area including a first subject similar to the whole of the search target, and a second collation area including a second subject similar to the feature portion of the search target, and
wherein the controller:
collates the whole of the search target image and the part of the search target image with the first collation area and the second collation area when both of the first collation area and the second collation area are searched out by the search;
collates the part of the search target image with the second collation area when the first collation area is not specified but the second collation area is searched out by the search; and collates the whole of the search target image with the first collation area when the first collation area is searched out but the second collation area is not searched out by the search.

8. A collation device comprising:
a storage that stores a search target image showing a search target;
an acquisition unit that acquires a captured image generated by an imaging device; and
a controller that determines whether the search target is included in the captured image,
wherein the controller:
searches out a collation area in the captured image, the collation area including a subject similar to at least a part of the search target; and
selects, depending on the collation area, at least one of a whole of the search target image and a part of the search target image, and collates the selected at least one with the captured image so as to determine whether the search target is included in the captured image, and
wherein the part of the search target image includes a feature portion specific to the search target, and
the collation area includes a first collation area including a first subject similar to the whole of the search target, and a second collation area including a second subject similar to the feature portion of the search target, and
wherein the controller performs the collation based on a feature quantity of the whole of the search target image and a feature quantity of the part of the search target image, and a feature quantity in the first collation area and a feature quantity in the second collation area.

9. A collation method comprising:
acquiring a search target image from a storage, the search target image showing a search target;
acquiring a captured image from an imaging device, the captured image being generated by the imaging device;
searching out a collation area in the captured image, the collation area including a subject similar to at least a part of the search target; and
selecting, depending on the collation area, at least one of a whole of the search target image and a part of the search target image, collating the selected at least one with the captured image, and determining whether the search target is included in the captured image,
wherein the part of the search target image includes a feature portion specific to the search target, and
the collation area includes a first collation area including a first subject similar to the whole of the search target, and a second collation area including a second subject similar to the feature portion of the search target,
collating the part of the search target image with the second collation area when the second collation area is searched out by the search; and
collating the whole of the search target image with the first collation area when the second collation area is not searched out by the search but the first collation area is searched out by the search.

10. A non-transitory computer-readable recording medium containing program instructions for causing a computer to execute the collation method according to claim 9.

* * * * *